W. E. WARD.
Machine for Making Bolts.
2 Sheets—Sheet 1.
No. 13,241.
Patented July 10, 1855.
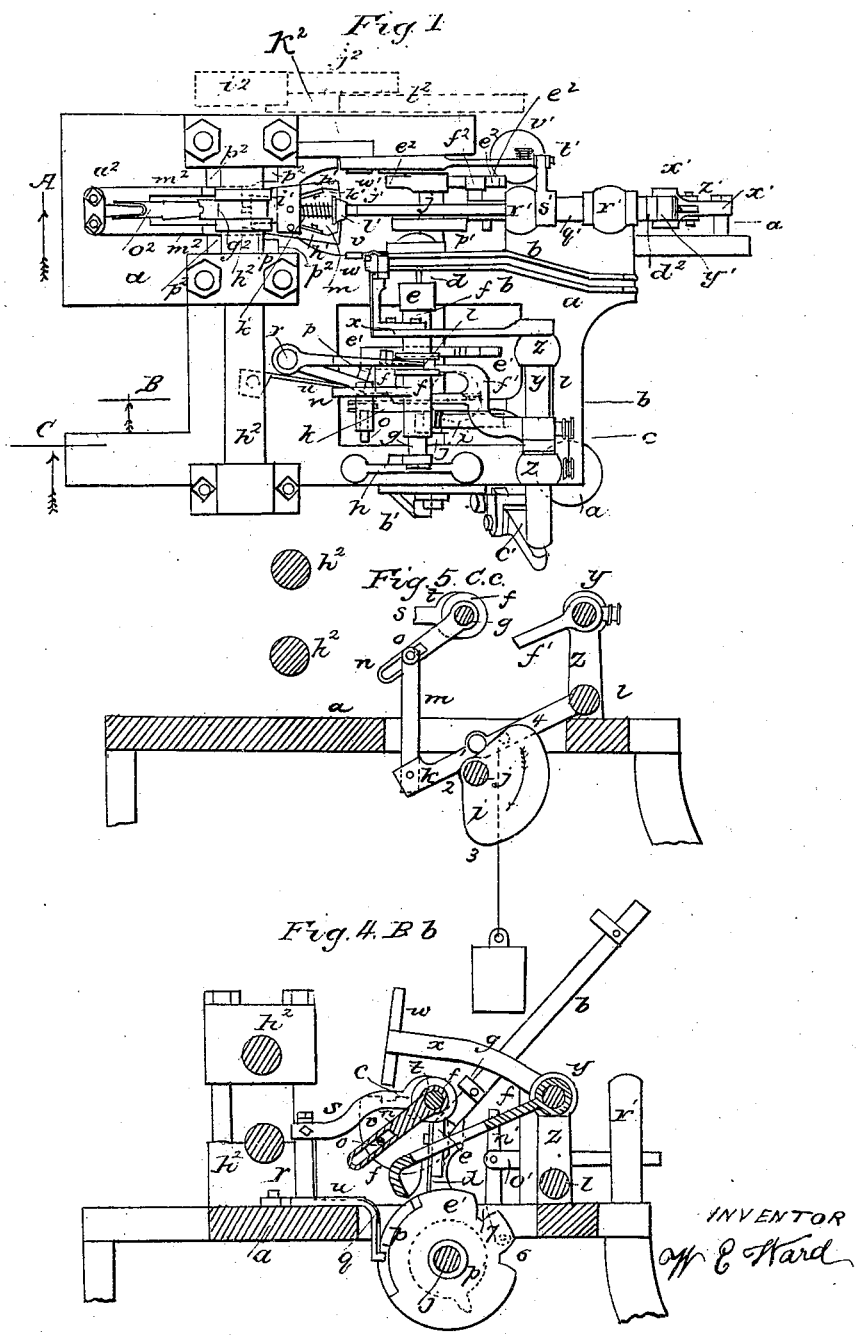

W. E. WARD.
Machine for Making Bolts.
No. 13,241.
2 Sheets—Sheet 2.
Patented July 10, 1855.
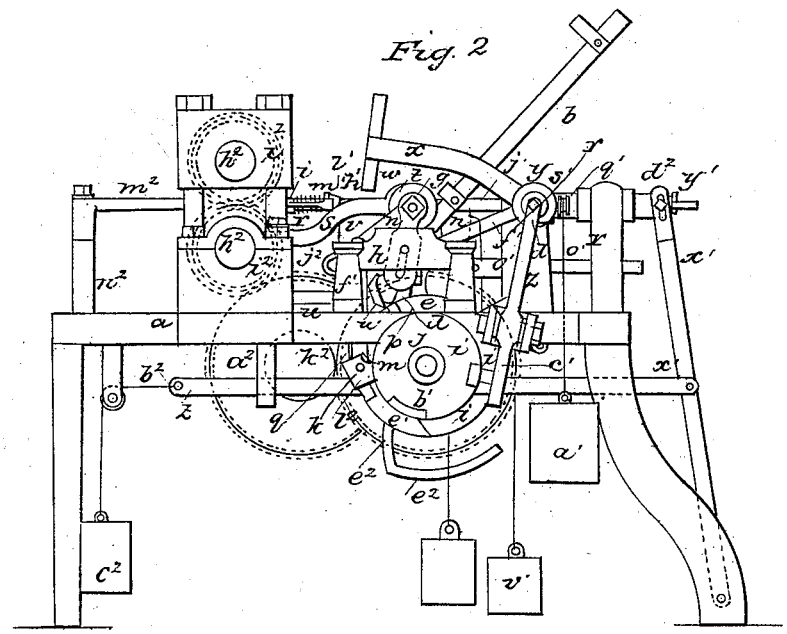
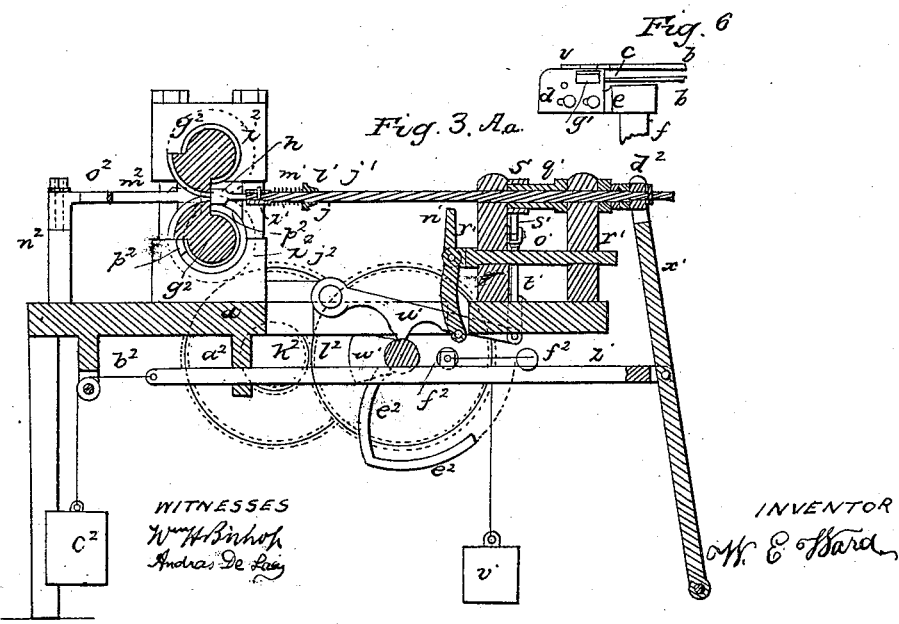

UNITED STATES PATENT OFFICE.

WM. E. WARD, OF PORT CHESTER, NEW YORK.

MACHINE FOR MAKING BOLTS.

Specification of Letters Patent No. 13,241, dated July 10, 1855.

*To all whom it may concern:*

Be it known that I, WILLIAM E. WARD, of Port Chester, Westchester county, and State of New York, have invented a new and useful Machine for Making Bolts with Shanks Partly Square and Partly Round, of which the following is a full, clear, and exact description, reference being had to the accompanying drawings, making part of this specification, in which—

Figure 1, is a top view. Fig. 2, a side elevation. Fig. 3, a longitudinal vertical section taken at the line A, $a$, of Fig. 1. Figs. 4 and 5, vertical sections taken at the lines B, $b$, and C, $c$, of Fig. 1; and Fig. 6, a plan of the wing $d$.

The same letters indicate like parts in all the figures.

My said invention is for making that class of wrought iron bolts in which that part of the shank next to the head is square and the rest cylindrical. They are made of square rods of the size of the square part of the shank, cut of the required length and the head swaged or otherwise formed in any suitable manner. And my said invention relates to a machine for rolling and drawing the end of the shank from the square to the cylindrical form.

The bolts after having been headed are supplied by any suitable means to inclined ways with the heads on the ways and the shanks hanging down between them, and by gravity they run down to the bottom where the ways are curved. And one by one these bolts are separated by a vibrating wing which enters between the one to be separated and the next in the series, and then the wing vibrates to bring it to a horizontal or nearly horizontal position that it may be taken by a pair of transferring pincers which transfer it to a pair of jaws by which it is gripped within the head. The jaws are on a sliding mandrel by which the bolt is carried to and between a pair of rotating segmental rollers which draw the end of the shank from the equare to the cylindrical form, the mandrel and jaws rotating a quarter of a revolution after the first drawing and preparatory to a second drawing at right angles to the first.

In the accompanying drawings $a$ represents a frame of suitable construction, and $b$, $b$, two inclined ways with a sufficient space between the two to receive the shank of the bolts freely with the heads resting on the ways down which they descend by gravity to the lower end where the two ways are curved in a semi-circular form as at $c$ see Fig. 4 where the lowest of the series of bolts will hang in a nearly vertical position; but with the lower end inclined a little forward; as the weight of the series of bolts on the ways will push the lowest one a little beyond the lowest part of the curved portion $c$, $c$ of the ways. While hanging in that position a wing $d$ is brought by an end movement between the last and the rest of the series of bolts to effect the separation. This wing $d$ is a thin plate of metal attached to an arm $e$ of a hollow rock shaft $f$ which turns and slides endwise on a stud $g$, attached to a standard $h$. The rocking motion of this shaft and wing is imparted by a cam $i$ see Fig. 5, on the cam shaft $j$ which acts on an arm $k$ of a rock shaft $l$, the end of this arm being connected by a joint link $m$ with an arm $n$ on the hollow rock shaft $f$ of the wing. The link is fitted to a wrist pin $o$ on the arm $n$ so that the hollow rock shaft can slide endwise independently of the connecting links. The form of the cam $i$ is such that from the point 1 to 2, in the direction the reverse of the arrow, it is concentric and of small diameter to keep the wing in the position to enter behind the bolt to be separated, and then from the point 2 to 3, it runs out with a rapid motion to turn the rock shaft and bring the wing with the bolt resting on it to a horizontal position; then from the point 3 to 4, the cam is concentric to keep the wing in that position while the bolt is being transferred by fingers to be presently described, and then from 4 to the point it runs with a rapid curve to let down the wing to its original position to take the next bolt.

Before the wing is let down from its horizontal position it is drawn back from the ways, and after it is let down, it is moved forward to enter behind the bolt to be separated. This is done by a cam $p$ on the face of a cam wheel on the same cam shaft $j$ which cam acts on an arm $q$ of a vertical rock shaft $r$, having another arm $s$ which embraces a collar $t$ on the hollow shaft of the wing, so that when the inclined face of the cam strikes the arm $q$ the wing is drawn from the ways and thus held back by the straight part of the cam while it moves down, and at the end of the cam the whole is forced inward, to carry the wing behind the bolt to be next taken up, by the tension of a spring $u$ acting on the arm $q$.

As the wing moves up, the bolt rests against the face of a plate $v$, which is a continuation of one of the ways, and as it is gradually turned from its hanging to a horizontal position the head is kept against the curved face of the ways.

The next operation is to take the bolt from the wing and transfer it to the jaws by which it is presented to the rolling operation. This is done by a pair of spring pincers or nippers $w$, on an arm $x$ of a rock shaft $y$ which rocks and slides endwise in standards $z, z$. The shaft is drawn in one direction to bring the pincers over the bolt resting on the wing by a weight $a'$ attached thereto and passing over a pulley, and it is pushed in the opposite direction to transfer the bolt by a cam $b'$ on the face of a wheel on the cam shaft $j$ which acts on one arm of a lever $c'$, the other arm of which has an adjusting screw $d'$ which bears against the end of the rock shaft $y$; the object of the adjusting screw being to adjust the position of the pincers to the position of the blank on the wing. The form of the arm $b'$ is such as to push the rock shaft $y$ endwise to carry the pincers from their position over the wing to the gripping jaws on the mandrel, to be presently described, and there hold it until the pincers descend to deposit the bolt and rise up again, and then to permit the weight $a'$ to draw it back that the pincers may be ready to descend and take another blank when brought up by the wing.

The pincers are moved up and down twice in each complete operation by a cam $e'$ see Fig. 4 on the cam shaft $j$ which acts on an arm $f'$ of the rock shaft $y$, the end of the said arm being broad enough to slide on the cam when the rock shaft moves endwise with the pincers. The cam $e'$ is a circular wheel to keep the pincers in an elevated position, and at 6 and 7 it is cut in sufficiently to let down and lift the pincers,—at 6, to take the bolt from the wing, and at 7, to present it to the jaws on the mandrel. One of the jaws of the pincers is fixed to the arm, and the other is jointed and closed by a spring. The two jaws are beveled on the inside so that as they are brought down they shall be opened by the bolt, the wing being cut out as at $g'$ see Fig. 6 to permit one of them to descend and the upper edge of the plate $v$ is beveled for the same purpose.

The bolt to be operated upon when transferred by the pincers is caught and gripped by a pair of jaws $h'$, $h'$ jointed to a cross bar $i'$ on the end of a mandrel $j'$. These jaws are opened by a spring $k'$ on each, and closed to grip the shank just within the head by a cone $l'$ that slides on the mandrel and which is forced back for that purpose by a helical spring $m'$ interposed between it and the cross bar $i'$. At the base the cone has a shoulder which is acted upon by a lever $n'$ jointed to an adjustable rod $o'$, the lower arm of which lever carries a wrist pin which is acted upon by a tappet on a wheel $p'$ on the cam shaft $j$, see dotted lines, Fig. 4, so that the jaws will spring open just as the pincers move with and present a bolt, and as this tappet passes instantly the cone is immediately pushed back by the helical spring to grip the bolt as the pincers rise and leave it.

The mandrel $j'$ is a long square bar (or a rod feathered bar may be substituted) fitted to slide and turn with a rock shaft $q'$ mounted in two standards $r'$, $r'$, provided with an arm $s'$ which is connected by an adjusting link $t'$ with the end of a lever $u'$, drawn down by a weight $v'$ to turn the rock shaft and mandrel a quarter of a revolution in one direction, and lifted up to turn the mandrel back by a cam $w'$ on the cam shaft $j$, see Fig. 3. The object of this is to present the several angles of the bolt to the rollers to be presently described to reduce the end of the bolt to the required cylindrical shape.

The rear end of the mandrel is connected with the upper end of a lever $x'$ by a sliding and rolling joint piece $y'$ the journals of which turn and slide in slots in the open end of the lever. And the lever is jointed to one end of a rod $z'$ that slides in a hanger $a^2$, the opposite end having a cord $b^2$ and weight $c^2$ to draw the lever, mandrel, and jaws toward the segment rollers that the bolt may be brought to the required position for being rolled. The extent of motion in this direction is regulated to determine the length of the square part of the shank, and the shock at the end of the motion is partially checked by leather washers $d^2$ on the mandrel and next to the joint piece $y'$.

The bolt held by the jaws on the mandrel having been introduced between the segment rollers (to be presently described) it is free to be moved back by the rollers as they act on it. After the rollers have completed the rolling and drawing, the mandrel is forced back to bring the jaws back by a cam $e^2$ see Fig. 3, on the cam shaft $j$, which acts on a roller $f^2$, on the rod $z'$, the form of the cam being such as to force back the jaws and mandrel with a rapid motion until the jaws are in the right position under the pincers, and then the cam is concentric for a given distance to hold the jaws in that position the required length of time to discharge the finished bolt which is effected by the action of the lever $n'$, on the flanch of the cone $l'$, and also to receive another bolt from the pincers $w$; and then the cam permits the weight $c^2$ to repeat the operation.

The rollers $g^2$, $g^2$ are each a segment grooved on the periphery to reduce the end of the stem of the bolt to a cylindrical form.

They are mounted on two parallel shafts $h^2$, $h^2$ geared together by spur wheels $i^2$, $i^2$, and arranged in the usual manner of rollers for rolling and drawing iron. Motion is imparted to the cam shaft $j$ by a train of wheels $j^2$, $k^2$, $l^2$ from one of the wheels $i^2$, so proportioned that the rollers shall make about four revolutions to one of the cam shaft.

After the two segment rollers have passed around, the space between the two shafts is all open leaving ample room for the introduction of the bolt; and as the segments come around, and just before they reach the bolt to act upon it, two spring guides $m^2$, $m^2$ placed just in front, are brought up, one on each side of the bolt, to hold it in the right position to be acted upon by the segment rollers. These guides turn on two stud pins $n^2$, $n^2$ and they are forced apart by an interposed spring $o^2$, and forced against the bolt by two cams $p^2$, $p^2$, on the shaft of the lower segment roller. In this way the bolt is held in a central position so that when the segments begin to act they are sure to find the bolt in the right position. The cams should not be such however as to cause the guides to grip the bolt, but simply to guide it. As soon as the segment rollers have rolled and drawn the bolt once they liberate it that it may be drawn forward again and turned a quarter of a revolution to be acted upon and drawn a second time at right angles to the first drawing to insure giving the required cylindrical form.

Having described the construction and arrangement of the machine and the mode of operation, I wish it to be distinctly understood that I do not limit myself to the special construction and arrangement, as these may be greatly varied by the substitution of equivalents without changing the mode of operation which distinguishes my invention from all other things before known.

What I claim as my invention and desire to secure by Letters Patent in the before described machine is—

1. The mode of operation, substantially as described, for drawing or rolling to a cylindrical shape the end of the stem of square bolts, by means of the segment rollers in combination with the jaws, or equivalent therefor, on the sliding and rotating mandrel operated by an arrangement of mechanism, such as herein described, or any equivalent therefor.

2. I also claim the mode of operation substantially as herein described for taking the bolts from the feeding ways, or any equivalent device by which they may be supplied, and bring them to a horizontal or nearly horizontal position by means of a vibrating wing which enters back of the bolt to be separated, and then vibrates to bring it to a horizontal or nearly horizontal position, in combination with the transferring pincers or any equivalent therefor, by which they are transferred to the jaws, the required motions being imparted by an arrangement of mechanism substantially such as herein described, or any equivalent therefor.

W. E. WARD.

Witnesses:
Wm. H. Bishop,
Andrew De Lacy.